United States Patent
Sugimoto et al.

(10) Patent No.: US 9,227,408 B2
(45) Date of Patent: Jan. 5, 2016

(54) LIQUID DISCHARGE RECORDING APPARATUS AND METHOD FOR RECOVERING LIQUID

(71) Applicant: Brother Kogyo Kabushiki Kaisha, Nagoya-shi, Aichi-ken (JP)

(72) Inventors: Junichiro Sugimoto, Nagoya (JP); Noriaki Satoh, Nagoya (JP); Akihiko Taniguchi, Kakamigahara (JP); Ayako Ohishi, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 14/493,506

(22) Filed: Sep. 23, 2014

(65) Prior Publication Data

US 2015/0091979 A1 Apr. 2, 2015

(30) Foreign Application Priority Data

Sep. 30, 2013 (JP) .................................. 2013-205689

(51) Int. Cl.
| | | |
|---|---|---|
| *B41J 2/165* | (2006.01) | |
| *B41J 2/00* | (2006.01) | |
| *C09D 11/38* | (2014.01) | |
| *C09D 11/54* | (2014.01) | |
| *C09D 11/322* | (2014.01) | |

(52) U.S. Cl.
CPC ............... *B41J 2/16517* (2013.01); *B41J 2/00* (2013.01); *B41J 2/1652* (2013.01); *B41J 2/16508* (2013.01); *B41J 2/16523* (2013.01); *C09D 11/322* (2013.01); *C09D 11/38* (2013.01); *C09D 11/54* (2013.01)

(58) Field of Classification Search
CPC ...... B41J 2/16517; B41J 2/00; B41J 2/16508; B41J 2/1652; B41J 2/16523; C09D 11/322; C09D 11/38; C09D 11/54
See application file for complete search history.

(56) References Cited

U.S. PATENT DOCUMENTS

| | | |
|---|---|---|
| 2006/0102046 A1 | 5/2006 | Okamura et al. |
| 2006/0109322 A1 | 5/2006 | Nakazawa et al. |
| 2007/0231557 A1 | 10/2007 | Komatsu |
| 2009/0258203 A1 | 10/2009 | Aoyama et al. |
| 2010/0086690 A1 | 4/2010 | Aoki |
| 2012/0230913 A1* | 9/2012 | Johnston .......... A61K 47/48684 424/1.49 |

FOREIGN PATENT DOCUMENTS

| | | |
|---|---|---|
| EP | 0841175 A2 | 5/1998 |
| EP | 1256607 A2 | 11/2002 |
| EP | 2738004 A1 | 6/2014 |
| JP | 2006-051776 A | 2/2006 |
| JP | 2006-168351 A | 6/2006 |
| JP | 2006-188712 A | 7/2006 |
| JP | 2010-090270 A | 4/2010 |
| JP | 2012-096369 A | 5/2012 |
| WO | 2004/080723 A1 | 9/2004 |

OTHER PUBLICATIONS

Dec. 15, 2014—(EP) Extended Search Report—App 14184975.2.

* cited by examiner

*Primary Examiner* — Thinh Nguyen
(74) *Attorney, Agent, or Firm* — Banner & Witcoff, Ltd.

(57) ABSTRACT

A liquid discharge recording apparatus includes: a first liquid containing 2-pyrrolidone; a liquid discharge head configured to discharge the first liquid; a second liquid containing a solvent of which freezing point is less than 20 degrees Celsius and of which specific gravity is less than 1.12 g/cm$^3$; and an absorber which contains the second liquid and which is configured to absorb the first liquid exited from the liquid discharge head.

20 Claims, 3 Drawing Sheets

SCANNING DIRECTION

LIQUID DISCHARGE RECORDING APPARATUS AND METHOD FOR RECOVERING LIQUID

CROSS REFERENCE TO RELATED APPLICATION

The present application claims priority from Japanese Patent Application No. 2013-205689 filed on Sep. 30, 2013, the disclosure of which is incorporated herein by reference in its entirety.

BACKGROUND OF THE INVENTION

1. Field of the Invention

The present invention relates to a liquid discharge recording apparatus and a method for recovering liquid.

2. Description of the Related Art

A water-based ink for ink-jet recording (hereinafter referred to as a "water-based ink" or an "ink" in some cases), in which a 2-pyrrolidone is added for the purpose of improving the wettability and chromogenic property thereof, has been suggested (see, for example, Japanese Patent Application Laid-open No. 2010-90270 corresponding to United States Patent Application Publication No. 2010/0086690 and Japanese Patent Application Laid-open No. 2006-188712 corresponding to United States Patent Application Publication No. 2006/0102046).

A water-based ink containing the 2-pyrrolidone, however, easily aggregates and easily accumulates, for example, in an absorber which absorbs the water-based ink in a maintenance mechanism of a liquid discharge recording apparatus such as an ink-jet recording apparatus. The water-based ink containing the 2-pyrrolidone and accumulated in the absorber contaminates a surface of an ink-jet head of the ink-jet recording apparatus and a recording paper (recording paper sheet) which is being transported in the ink-jet recording apparatus, in some cases.

An object of the present teaching is to provide a liquid discharge recording apparatus and a method for recovering a liquid which are capable of suppressing any contamination of a surface of the ink-jet head and of a recording paper which is being transported in the liquid discharge recording apparatus by suppressing any accumulation of the liquid containing the 2-pyrrolidone.

SUMMARY OF THE INVENTION

According to a first aspect of the present teaching, there is provided a liquid discharge recording apparatus including:

a first liquid containing 2-pyrrolidone;

a liquid discharge head configured to discharge the first liquid;

a second liquid containing a solvent of which freezing point is less than 20 degrees Celsius and of which specific gravity is less than 1.12 g/cm$^3$; and an absorber which contains the second liquid and which is configured to absorb the first liquid exited from the liquid discharge head.

According to a second aspect of the present teaching, there is provided a liquid-recovery method for recovering a liquid in a liquid discharge recording apparatus, the method including:

causing a first liquid containing 2-pyrrolidone to exit from a liquid discharge head of the liquid discharge recording apparatus; and recovering the first liquid by absorbing the first liquid exited from the liquid discharge head with an absorber which is provided in the liquid discharge recording apparatus and which contains a second liquid, wherein the second liquid contains a solvent of which freezing point is less than 20 degrees Celsius and of which specific gravity is less than 1.12 g/cm$^3$.

DESCRIPTION OF THE PREFERRED EMBODIMENTS

A liquid discharge recording apparatus of the present teaching includes a first liquid containing 2-pyrrolidone; a liquid discharge head configured to discharge the first liquid; and an absorber which contains a second liquid and which is configured to absorb the first liquid exited from the liquid discharge head, the second liquid containing a solvent of which freezing point is less than 20 degrees Celsius and of which specific gravity is less than 1.12 g/cm$^3$. The term "specific gravity" of the solvent in the present teaching means a value with respect to water of which temperature is 4 degrees Celsius. Further, in the specification, "the first liquid exited from the liquid discharge head" includes the first liquid which is discharged actively and made to exit from the nozzles, and the first liquid which is forced to exit from the nozzles as in the suction purge or push purge.

The first liquid usable in the liquid discharge recording apparatus of the present teaching includes, for example, a water-based ink for ink-jet recording, a treatment solution (treatment liquid) used in the ink-jet recording, etc. The treatment liquid is a liquid which is discharged to a recording medium before or after the discharge of ink, for the purpose of improving the quality of image (image quality), etc. Further, the first liquid is not limited to a liquid to be used for ink-jet recording, and is exemplified, for example, by a shipping liquid (preservative liquid), an introductory liquid, an inspection liquid, etc. The shipping liquid is a liquid charged into a flow channel, of a liquid discharge recording apparatus, in a state of shipped out from the factory so as to preserve that state inside the flow channel. The introductory liquid is a liquid which is charged in advance into the flow channel of the liquid discharge recording apparatus in the factory upon shipping the liquid discharge recording apparatus from the factory such that, when the liquid discharge recording apparatus is purchased by an user and the ink is introduced into the flow channel, the ink is easily introduced into the flow channel. The inspection liquid is a liquid to be used for inspecting the discharge of the liquid discharge head in the factory. As described above, the first liquid contains 2-pyrrolidone. It is allowable to prepare the first liquid or to use any commercially available liquid product which contains 2-pyrrolidone.

According to the present teaching, it is possible to suppress the accumulation of the first liquid containing the 2-pyrrolidone inside the liquid discharge recording apparatus. Therefore, for example, it is possible to add a necessary and sufficient amount of the 2-pyrrolidone to an ink applied to the liquid discharge recording apparatus of the present teaching, thereby making it possible to improve the permeability and chromogenic property as well. Further, the 2-pyrrolidone functions also as a wetting agent. Thus, the first liquid containing the necessary and sufficient amount of the 2-pyrrolidone can suppress any clogging of the nozzles in the liquid discharge head.

In a case that the first liquid is an ink, the first liquid may contain at last one of a dye and a pigment as a colorant, among which the pigment is preferable as the colorant. Further, it is allowable that the ink does not contain any dye and contains substantially only a pigment, as the colorant. In a case that the colorant is the pigment and that the ink is discharged onto a surface of the recording medium, there is a fear that the pigment might accumulate on the surface of the absorber. The liquid discharge recording apparatus of the present teaching, however, is capable of suppressing any accumulation of the pigment on the surface of the absorber. The blending amount of the colorant in the entire amount of the ink is not particularly limited, and may be appropriately determined based on, for example, desired optical density or color (hue, tint), etc. The blending amount of the colorant in the entire amount of the ink is, for example, in a range of 0.2% by weight to 20% by weight, and is preferably in a range of 2% by weight to 10% by weight. The blending amount of the 2-pyrrolidone in the entire amount of the ink is not particularly limited, and is, for example, in a range of 0.5% by weight to 15% by weight, is preferably in a range of 1% by weight to 10% by weight, and is more preferably in a range of 2% by weight to 5% by weight. The ink may further contain any other conventionally known additive(s) exemplified by surfactants, rust-preventing agents, fungicides, etc., as necessary.

In a case that the first liquid is a liquid different from the ink, such as the treatment liquid, introductory liquid, shipping liquid (preservative liquid), inspection liquid, etc., it is allowable that the first liquid does not contain any colorant, or that the first liquid contains a colorant so that the presence of the first liquid can be visually confirmed. In a case that the first liquid which is different from the ink contains a colorant, the blending amount of the colorant in the first liquid is preferably not more than 0.5% by weight. In a case that the first liquid is the liquid different from the ink, such as the treatment liquid, introductory liquid, shipping liquid (preservative liquid), inspection liquid, etc., the blending amount of the 2-pyrrolidone in the entire amount of the first liquid is not particularly limited, and is, for example, in a range of 0.5% by weight to 15% by weight, is preferably in a range of 1% by weight to 10% by weight, and is more preferably in a range of 2% by weight to 5% by weight.

Next, a liquid discharge recording apparatus and a liquid recovery method of the present teaching will be specifically explained. The liquid discharge recording apparatus of the present teaching includes a liquid discharge head which discharges a liquid and an absorber which absorbs the first liquid exited from the liquid discharge head. The absorber is preferably at least one of a flushing absorber, a waste liquid absorber and a platen absorber, wherein the flushing absorber is arranged in a non-recording area of the liquid discharge recording apparatus, the waste liquid absorber directly or indirectly absorbs the first liquid exited from the liquid discharge head and stores the first liquid therein, and the platen absorber is arranged in a recording area of the liquid discharge recording apparatus. In the liquid discharge recording apparatus of the present teaching, the configuration of the liquid discharge recording apparatus, except for the absorber, may be similar to that of a conventional liquid discharge recording apparatus such as an ink-jet recording apparatus. The liquid recovery method of the present teaching is practiced by using the liquid discharge recording apparatus of the present teaching.

The absorber contains a second liquid. The second liquid contains a solvent (hereinafter referred to as a "specific solvent") of which freezing point is less than 20 degrees Celsius and of which specific gravity is less than 1.12 g/cm$^3$. The specific solvent of which freezing point is less than 20 degrees Celsius is in a liquid state at a temperature in the vicinity of the room temperature. In the absorber, the first liquid makes contact with the specific solvent in the liquid state, thereby suppressing any deposition and accumulation of a component, in the first liquid, such as the 2-pyrrolidone, the colorant, etc., and promoting the absorption of the first liquid into the absorber. Further, in view of promoting the absorption of the first liquid into the absorber, the freezing point of the second liquid is preferably less than 10 degrees Celsius, is more preferably less than 0 degrees Celsius, and is furthermore preferably less than −40 degrees Celsius. Moreover, in a case that the freezing point of the second liquid is less than 5 degrees Celsius, the accumulation of the first liquid containing 2-pyrrolidone can be suppressed even under an environment of 5 degrees Celsius, and thus the liquid-recovery method of the present teaching can be practiced also at a low temperature. Further, the freezing point of the specific solvent is preferably not less than −100 degrees Celsius, and is more preferably not less than −80 degrees Celsius.

Furthermore, the specific gravity of the specific solvent is relatively small, i.e., is less than 1.12 g/cm$^3$. Therefore, the first liquid absorbed by the absorber permeates in the absorber to a portion below the specific solvent, thereby suppressing any deposition and accumulation of a component, such as the colorant, the 2-pyrrolidone, etc., contained in the first liquid and promoting the absorption of the first liquid into the absorber. Further, in view of affinity of the specific solvent for the first liquid absorbed by the absorber, the specific gravity of the specific solvent is preferably not less than 0.85 g/cm$^3$. Furthermore, the specific gravity of the specific solvent is preferably smaller than the specific gravity of the first liquid.

In a case that the absorber in the present teaching is, for example, a flushing absorber and a platen absorber, the accumulation of the first liquid on the surface(s) of the absorber(s) is suppressed, thereby suppressing any clogging of the nozzles which would be otherwise caused due to any contact of the first liquid, accumulated on the surface of the absorber, with the liquid discharge head, and further suppressing any contamination (dirtying) of the recording medium such as a recording paper (recording sheet) which would otherwise be caused due to any contact of the first liquid, accumulated on the surface of the absorber, with the recording medium. Further, in a case that the absorber is a waste liquid absorber and that the first liquid deposits and accumulates in the waste liquid absorber, it is difficult for the waste liquid absorber to absorb a designed amount of the waste liquid. In the present teaching, since the deposition and accumulation of the first liquid in the waste liquid absorber is suppressed, the waste liquid absorber is capable of absorbing the designed amount of the waste liquid.

Any substance can be used as the specific solvent, provided such a substance has a freezing point of less than 20 degrees Celsius and a specific gravity of less than 1.12 g/cm$^3$. However, as the specific solvent, it is preferable to use polyhydric alcohol, glycol ether, nitrogen-containing compound and fatty acid. Further, the specific solvent is preferably a water-soluble solvent. The specific solvent is exemplified, for example, by diethylene glycol (DEG), triethylene glycol n-butyl ether (BTG), N-methyl-2-pyrrolidone (N-methyl-2P), 1,5-pentanediol (1,5-PG), 1,3-dimethyl-2-imidazolidinone, oleic acid, triethylene glycol (TEG), tetraethylene glycol n-butyl ether, propylene glycol n-butyl ether, dipropylene glycol n-butyl ether, tripropylene glycol n-butyl ether, dipropylene glycol n-propyl ether, erucic acid, linoleic acid, etc. The specific solvent is preferably at least one of the DEG and BTG. It is allowable that only one kind of the specific solvent is used singly, or that two or more kinds of the specific solvent are used in a mixed manner.

TABLE 1 as follows shows the freezing points and specific gravities of the representative specific solvents.

TABLE 1

|  | Freezing Point (degrees Celsius) | Specific Gravity (g/cm$^3$) |
| --- | --- | --- |
| Diethylene glycol (DEG) | −68 | 1.118 |
| Triethylene glycol n-butyl ether (BTG) | −48 | 0.9866 |
| N-methyl-2-pyrrolidone (N-methyl-2P) | −23 | 1.027 |
| 1,5-pentanediol (1,5-PG) | −18 | 0.99 |
| 1,3-dimethyl-2-imidazolidinone | 8 | 1.06 |
| Oleic acid | 10 | 0.90 |
| Triethylene glycol (TEG) | 9.4 | 1.12 |
| Propylene glycol n-butyl ether | <−75 | 0.88 |
| Dipropylene glycol n-butyl ether | <−75 | 0.94 |
| Tripropylene glycol n-butyl ether | <−60 | 0.92 |
| Dipropylene glycol n-propyl ether | <−60 | 0.92 |
| Linoleic acid | −5 | 0.90 |

The second liquid may be composed only of the specific solvent, or may contain other solvent, such as water, etc., which is different from the specific solvent. The second liquid may be an aqueous solution of the specific solvent. The water is preferably ion-exchange water or pure water (purified water). In view of the suppressing the accumulation of the first liquid into the absorber, the blending amount of the specific solvent in the entire amount of the second liquid is, for example, in a range of not less than 20% by weight to not more than 100% by weight, is preferably in a range of not less than 50% by weight to not more than 100% by weight, and is more preferably in a range of not less than 80% by weight to not more than 100% by weight. Further, in view of suppressing the accumulation of the first liquid into the absorber, the blending ratio of the specific solvent to the entire amount of the second liquid is, for example, not less than 5 times, is preferably not less than 10 times, and is more preferably not less than 20 times the blending ratio of the 2-pyrrolidone contained in the first liquid. Further, the blending ratio of the specific solvent to the entire amount of the second liquid is preferably not more than 200 times the blending ratio of the 2-pyrrolidone contained in the first liquid. Furthermore, the blending ratio of the specific solvent to the entire amount of the second liquid is preferably not less than 6 times, and is more preferably in a range of 6 times to 25 times the blending ratio of the 2-pyrrolidone contained in the first liquid.

In the liquid discharge recording apparatus of the present teaching, the absorber which absorbs the first liquid exited from the liquid discharge head may be any absorber provided that the absorber is capable of absorbing the first liquid. For example, the absorber is exemplified by melamine foam, urethane foam, polyethylene foam, silicone foam, acrylic foam, chloroprene rubber (CR) sponge, natural rubber (NR) sponge, nitrile rubber (NBR) sponge, ethylene propylene diene rubber (EPDM) sponge, felt foam, needle felt among which melamine foam is preferable.

In the present teaching, it is allowable that the second liquid is contained in the absorber before the first liquid is absorbed by the absorber so that the first liquid discharged from (exited from) the liquid discharge head can make contact with the second liquid in the absorber. The second liquid, however, is preferably contained in the absorber before the liquid discharge recording apparatus is shipped from the factory, etc. As an aspect in which the second liquid is not contained in the absorber when the liquid discharge recording apparatus is shipped from the factory, etc., it is possible to conceive a liquid discharge recording apparatus which is provided with a liquid discharge head configured to discharge the second liquid onto the absorber. With this liquid discharge recording apparatus having such a special configuration, it is possible to allow the absorber to contain the second liquid by discharging the second liquid onto the absorber before allowing the absorber to absorb the first liquid. However, such a liquid discharge recording apparatus having the above-described special configuration requires a high cost and complex control therefor. Further, there is a fear that it might be difficult to allow a sufficient amount of the second liquid to be contained in the absorber. Furthermore, since the second liquid is required to have a physical property such that the second liquid can be discharged from the liquid discharge head, there is fear that the specific solvent might not be contained in the second liquid in a sufficient blending ratio. In particular, the above situation might be problematic in a case that an ink-jet head of the thermal ink-jet system is used as the liquid discharge head. On the other hand, in a case that the second liquid is contained in the absorber when the liquid discharge recording apparatus is shipped from the factory, etc., the cost is low and any complex control is not required. Further, the second liquid can contain the specific solvent in a sufficient blending ratio, and it is also easy to allow the sufficient amount of the second liquid to be contained in the absorber.

The absorber absorbs the first liquid exited from the liquid discharge head. The method for causing the absorber to absorb the first liquid is not particularly limited; it is allowable, for example, to cause the absorber to absorb the first liquid by discharging the first liquid toward the absorber by a liquid discharge head such as an ink-jet head or to allow the absorber to absorb the first liquid sucked from the liquid discharge head by a suction pump, as will be described below.

Figure 1:
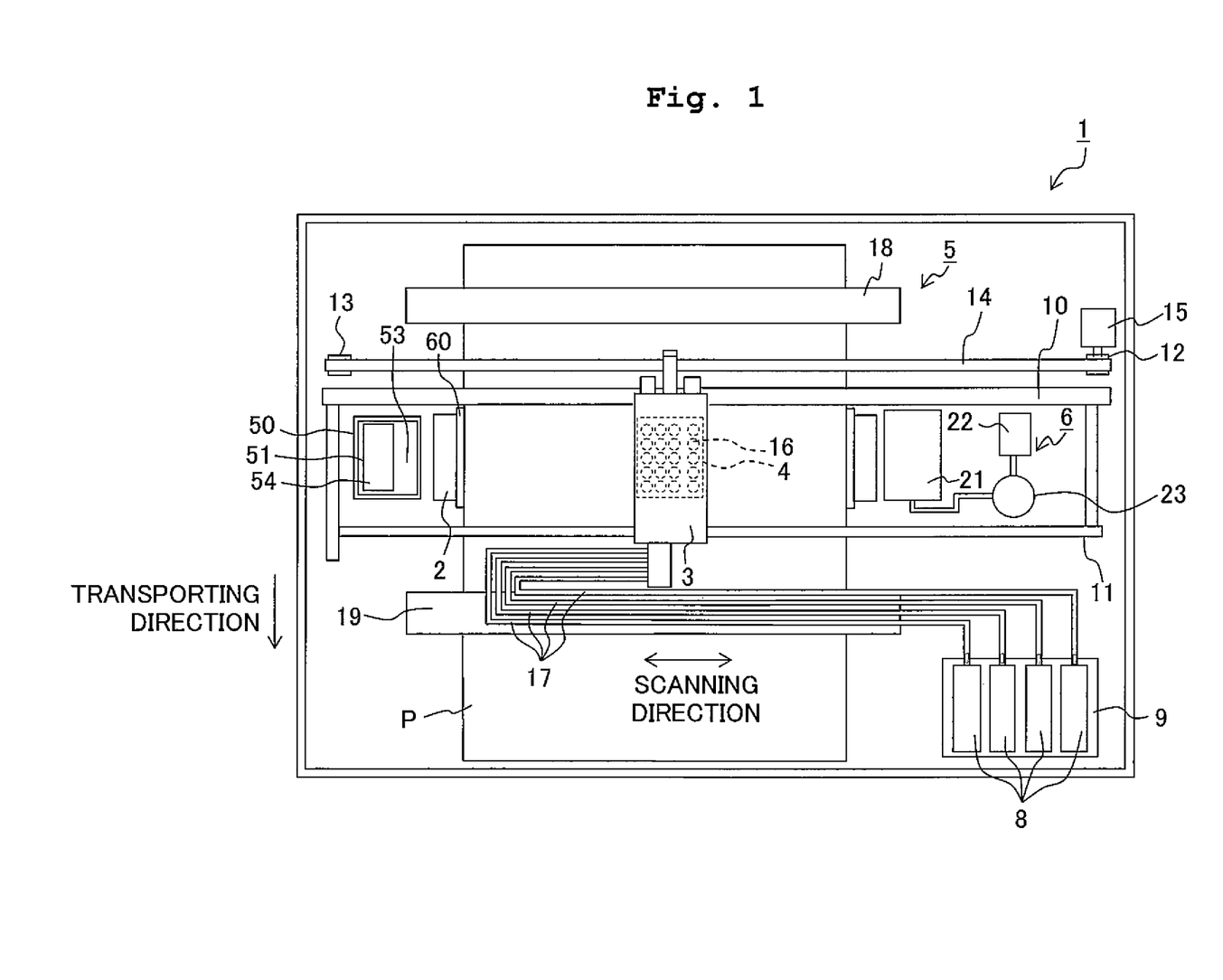
FIG. 1 is a schematic plane view showing the configuration of an example of a liquid discharge recording apparatus of the present teaching.

FIG. 1 shows the configuration of an example of the liquid discharge recording apparatus of the present teaching. As shown in FIG. 1, a liquid discharge recording apparatus 1 of the present teaching includes a platen 2, a carriage 3, an ink-jet head (liquid discharge head) 4, a transporting mechanism 5 and a maintenance unit 6 as main constitutive components or parts. The ink-jet head 4 may be of any system including the piezoelectric element system, the thermal ink-jet system, the electrostatic attraction system, etc. In this embodiment, an ink-jet head of the thermal ink-jet system is used.

A recording medium (for example, recording paper or recording sheet) P supplied from a paper feeding mechanism (not shown in the drawings) is placed on the upper surface of the platen 2. Two guide rails 10 and 11 are arranged at a position above or over the platen 2, and extend parallel to each other in the scanning direction (left/right direction in FIG. 1). The carriage 3 is movable in a reciprocating manner in the scanning direction along the two guide rails 10 and 11 in an area at which the carriage 3 faces or is opposite to the platen 2.

The two guide rails 10 and 11 extend in the scanning direction to further protrude from the left and right ends of the platen 2. The carriage 3 is configured to be movable from the area facing the recording paper P on the platen 2 (recording area) to a position located away from both of the left/right ends of the platen 2 (non-recording area). An endless belt 14 wound between two pulleys 12 and 13 is connected to the carriage 3. By driving the endless belt 14 to run by a carriage driving motor 15, the carriage 3 is reciprocated in the scanning direction, accompanying with the running of the endless belt 14.

The ink-jet head 4 is installed in a lower portion of the carriage 3. The lower surface of the ink-jet head 4 is a liquid discharge surface 4a (see FIG. 2) which is parallel to the upper surface of the platen 2 and in which a plurality of nozzles 16 are opened. The first liquid (ink) is discharged from the plurality of nozzles 16 of the liquid discharge surface 4a toward the recording paper P placed on the platen 2 so as to perform recording on the recording paper P.

Four ink supply ports (not shown in the drawings) corresponding to colors of black, yellow, cyan and magenta, respectively are provided on the upper surface of the ink-jet head 4, and one ends of four tubes 17 are connected to the four ink supply ports, respectively. The other ends of the four tubes 17 are connected to a cartridge installation section 9 that is configured such that four ink cartridges 8 storing the four color inks respectively are detachably attached to the cartridge installation section 9. With this configuration, the inks of the respective four colors are supplied to the ink-jet head 4 from the four ink cartridges 8 installed in the cartridge installation section 9 via the four tubes 17, respectively.

The transporting mechanism 5 has two transporting rollers 18 and 19 which are arranged so as to sandwich the platen 2 therebetween in a transporting direction (direction from the upper portion to the lower portion on the sheet surface in FIG. 1). The recording paper P placed on the platen 2 is transported in the transporting direction by the two transporting rollers 18 and 19.

The liquid discharge recording apparatus 1 discharges the first liquid from the ink-jet head 4 installed in the carriage 3 toward the recording paper P placed on the platen 2 and transports the recording paper P in the transporting direction by the two transporting rollers 18 and 19, thereby recording desired image and/or letter, etc., on the recording paper P.

Next, the maintenance unit 6 will be explained. The maintenance unit 6 includes a purge unit and a flushing unit. The purge unit has a waste liquid absorber 22, a suction cap 21 and a suction pump 23 which are arranged on one side in the scanning direction (on the right side in FIG. 1) with respect to the platen 2. The flushing unit is arranged on the other side in the scanning direction (on the left side in FIG. 1) with respect to the platen 2, and includes a first flushing absorber 53, a second flushing absorber 54, a waste liquid tank 50 and a liquid receiving member 51, as main constitutive components or parts.

The suction cap 21 is driven by a cap driving mechanism including a driving mechanism such as a motor (not shown) so that the suction cap 21 is driven to move in the up and down direction and to make approach/separation with respect to the liquid discharge surface 4a. The suction pump 23 is connected to the suction cap 21. When the suction cap 21 makes contact with the liquid discharge surface 4a, the suction cap 21 covers the openings of the plurality of nozzles 16. In a case that the suction cap 21 is in a capping state in such a manner, the suction pump 23 is driven to perform suction and depressurization in the inside of the suction cap 21, thereby causing the first liquid to exit from all of the nozzles 16 covered by the suction cap 21 (suction purge). The suction pump 23 is connected to the waste liquid absorber 22. The first liquid sucked and made to exit from the nozzles 16 by the suction purge is absorbed by the waste liquid absorber 22 via the suction pump 23. Although not shown in the drawings, the waste liquid absorber 22 is accommodated in a box which is open at an upper portion of the box. The waste liquid absorber 22 may be any member provided that such a member is capable of absorbing the first liquid, such as, for example, a melamine foam, etc. In the embodiment, the purge unit is configured to suck the first liquid from the nozzles 16 by the suction pump 23. However, the purge unit may be configured as a so-called "push purge" mechanism which applies pressure to the first liquid inside the ink-jet head 4 to thereby cause the first liquid to exit from the nozzles 16. Namely, the first liquid absorbed by the absorber in the present teaching may be the first liquid which is discharged actively and made to exit from the nozzles, or the first liquid which is forced to exit from the nozzles as in the suction purge. Alternatively, in the present teaching, it is allowable to provide such an aspect wherein the absorber receives the first liquid discharged directly to the absorber, or another aspect wherein the absorber (such as the waste liquid absorber 22) receives the first liquid indirectly, e.g. the first liquid fed from the suction pump 23, etc. to the absorber.

Figure 2:
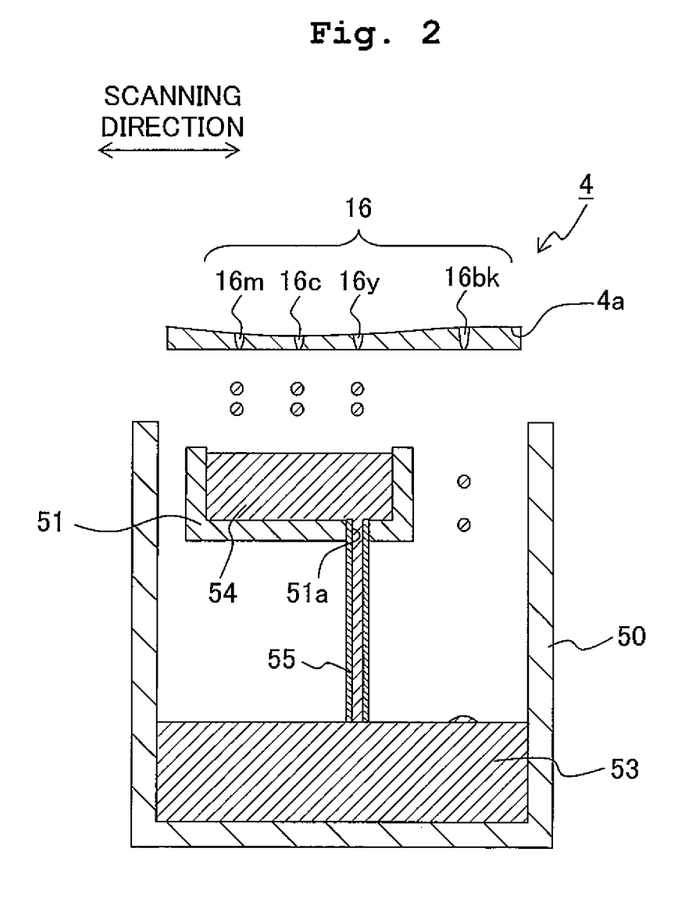
FIG. 2 is a cross-sectional view of a waste liquid tank in a vertical plane including a scanning direction for the liquid discharge recording apparatus shown in FIG. 1 when the liquid discharge recording apparatus performs liquid recovery operation.

As shown in FIG. 2, the waste liquid tank 50 has a box-shape which is open at an upper portion thereof, and accommodates the first flushing absorber 53 inside of the waste liquid tank 50. The liquid receiving member 51 is arranged at a position above or over the first flushing absorber 53. The liquid receiving member 51 has a box-shape which is open at an upper portion thereof, and accommodates the second flushing absorber 54 inside of the liquid receiving member 51. A discharge port 51a is formed in the liquid receiving member 51 at a portion on the bottom surface and located on one side in the scanning direction (on the right side in FIG. 2). The discharge port 51a is connected to one end of a tube 55 of which other end makes contact with the upper surface of the first flushing absorber 53. With this, the first liquid absorbed by the upper surface of the second flushing absorber 54 moves downwardly and is discharged from the discharge port 51a to the first flushing absorber 53, via the tube 55. Each of the first and second flushing absorbers 53 and 54 may be any member provided that such a member is capable of absorbing the first liquid, such as, for example, a melamine foam, etc.

Figure 3A:
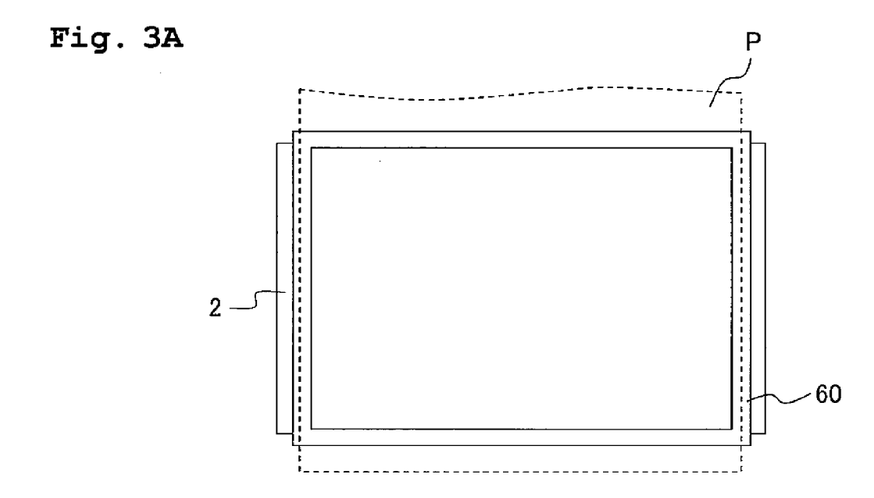
FIG. 3A is a plane view of a platen and a platen absorber of the liquid discharge recording apparatus shown in FIG. 1.
Figure 3B:
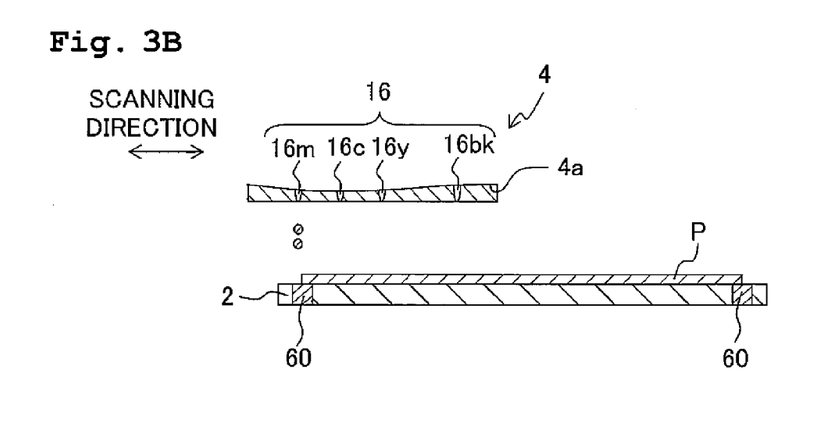
FIG. 3B is a cross-sectional view of the platen and the platen absorber in the vertical plane including the scanning direction when the liquid discharge recording apparatus shown in FIG. 1 performs liquid recovery operation.

Next, a platen absorber 60 will be explained with reference to FIGS. 3A and 3B. FIG. 3A is a plan view of the platen 2 and the platen absorber 60, and FIG. 3B is a cross-sectional view of the platen 2 and the platen absorber 60 in the vertical plane including the scanning direction when the liquid is being recovered (during a liquid recovery operation). Note that in FIG. 3A, the recording paper P is depicted by broken lines, and the lower portion of the recording paper P is depicted in phantom. As shown in FIGS. 3A and 3B, the platen absorber 60 having a rectangular cylindrical shape is integrated into the platen 2 at a lower portion of an area in which an end or edge portion of the recording paper P passes. With this, in case of performing for example a borderless recording with respect to the recording paper P, it is possible to absorb, with the platen absorber 60, the first liquid discharged onto the upper surface of the platen 2 beyond the end portion of the recording paper P. The platen absorber 60 may be any member provided that such a member is capable of absorbing the first liquid, such as, for example, a melamine foam, etc. Further, the shape of the platen absorber 60 is not limited to the shape of rectangular cylindrical shape shown in FIGS. 3A and 3B, and the platen absorber 60 may have any shape provided that the platen absorber 60 is capable of absorbing the first liquid discharged beyond the end portion of the recording paper P.

The first flushing absorber 53, the second flushing absorber 54, the waste liquid absorber 22 and the platen absorber 60 contain the specific solvent. In each of the first and second flushing absorbers 53 and 54 and the platen absorber 60, the specific solvent may be contained only at a portion which makes contact with the first liquid discharged from the ink-jet head 4, or may be contained in the entirety of each of the first and second flushing absorbers 53 and 54 and the platen absorber 60. Further, each of the first flushing absorber 53, the second flushing absorber 54, and the platen absorber 60 may be provided independently (separately) respectively for the colors of the first liquids (such as inks) discharged from the ink-jet head 4. In such a case, the blending amount of the specific solvent contained in each of the first flushing absorber 53, the second flushing absorber 54, and the platen absorber 60 may be determined depending on the content amount of the 2-pyrrolidone contained in one of the discharged first liquids.

Next, an example of the liquid recovery method of the present teaching will be explained with reference to FIG. 2. The example shown in FIG. 2 is an aspect wherein the first liquid is recovered by discharging the first liquid from the ink-jet head 4 directly to the flushing absorber. FIG. 2 is a cross-sectional view of the waste liquid tank 50 in a vertical plane including the scanning direction when the liquid discharge recording apparatus 1 shown in FIG. 1 performs liquid recovery operation. In FIG. 2, reference numerals "16$bk$", "16$y$", "16$c$" and "16$m$" indicate nozzles 16 for black, yellow, cyan and magenta inks, respectively. In the liquid discharge recording apparatus 1, the ink-jet head 4 may further have a nozzle and a supply port for a treatment liquid. The liquid discharge recording apparatus 1 may further have a cartridge in which the treatment liquid is stored and a tube for supplying the treatment liquid.

When the liquid is recovered in this example, the ink-jet head 4 is stopped, without scanning in the scanning direction, and the inks discharged from the nozzles 16 are discharged immediately downwardly. FIG. 2 shows an example wherein liquid recovery for recovering the black ink from the nozzle 16$bk$ and liquid recovery for recovering the three color inks that are yellow, cyan and magenta inks from the nozzles 16$y$, 16$c$ and 16$m$ are performed at the same time. A timing for discharging the ink(s) is exemplified by a timing before starting the recording on recording paper P, a timing between the paper sheets during a continuous recording (from a point of time after completing recording on one sheet of the recording paper P and until a point of time starting the recording on next sheet of the recording paper P), etc.

In FIG. 2, the first liquids (inks) are recovered by discharging the inks of the respective colors that are the black ink and the yellow, cyan and magenta inks from the nozzle 16$bk$ of the black ink and the nozzles 16$y$, 16$c$ and 16$m$ of the three color inks toward the first flushing absorber 53 accommodated in the waste liquid tank 50 and the second flushing absorber 54 accommodated in the liquid receiving member 51, respectively, at a position at which the nozzle 16$bk$ of the black ink is made to face or to be opposite to the first flushing absorber 53, and at which the nozzles 16$y$, 16$c$ and 16$m$ of the three color inks are made to face the second flushing absorber 54. Note that the liquid recovery of the liquid from the nozzle 16$bk$ of the black ink and the liquid recovery of the liquids from the nozzles 16$y$, 16$m$, and 16$c$ of the three color inks may be performed separately from each other. Further, in a case that the ink-jet head 4 has the nozzle for the treatment liquid, liquid recovery of the treatment liquid from the nozzle for the treatment liquid can also be performed by moving the nozzle for the treatment liquid to a position facing or to be opposite to the first or second flushing absorber 53 or 54, in a similar manner as for the recovery of the inks. In view of preventing any liquid leakage (dripping) from the absorbers, the maximum amount of the second liquid containing the specific solvent and contained in the first and second flushing absorbers 53 and 54 is preferably not more than 0.91 $\mu g/mm^3$, and is more preferably not more than 0.7 $\mu g/mm^3$. Further, in view of suppressing the accumulation of the first liquid in the absorber, the minimum amount of the second liquid contained in the first and second flushing absorbers 53 and 54 is preferably not less than 0.01 $\mu g/mm^3$ and is more preferably not less than 0.05 $\mu g/mm^3$.

Furthermore, the amount of the specific solvent in the second liquid contained in the absorber may be determined depending on, for example, the amount of the 2-pyrrolidone contained in the first liquid, the period of service life or lifetime of the liquid discharge recording apparatus, etc. For example, in a case that the absorber is the flushing absorber of the liquid discharge recording apparatus, the amount of the specific liquid in the second liquid contained in the flushing absorber is preferably not less than 0.10 g, is more preferably not less than 0.18 g, is preferably not more than 0.81 g, and is more preferably not more than 0.63 g.

Since the specific solvent is contained in each of the first flushing absorber 53 and the second flushing absorber 54, it is possible to suppress the accumulation of the first liquid containing the 2-pyrrolidone.

Next, another example of the liquid recovery method of the present teaching will be explained with reference to FIG. 1. As described above, in the liquid discharge recording apparatus 1 shown in FIG. 1, the first liquid sucked and discharged (made to exit) by the suction purge is absorbed by the waste liquid absorber 22 via the suction pump 23. In view of preventing any liquid leakage (dripping) from the absorber, the maximum amount of the specific solvent contained in the second liquid contained in the waste liquid absorber 22 is preferably not more than 0.91 $\mu g/mm^3$, and is more preferably not more than 0.7 $\mu g/mm^3$. Further, in view of suppressing the accumulation of the first liquid in the absorber, the minimum amount of the second liquid contained in the waste liquid absorber 22 is preferably not less than 0.01 $\mu g/mm^3$ and is more preferably not less than 0.05 $\mu g/mm^3$. Since the waste liquid absorber 22 also contains the second liquid containing the specific solvent, it is possible to suppress the accumulation of the first liquid containing the 2-pyrrolidone. In such a manner, the present teaching is applicable also to an aspect wherein the first liquid exited from the ink-jet head 4 is absorbed by the waste liquid absorber 22 via the suction pump 23, without being limited only to the case that the first liquid exited from the ink-jet head 4 is directly absorbed. Further, in a case that the first liquid is the shipping liquid charged into a flow channel and the ink-jet head 4, the shipping liquid is discharged from the ink-jet head by a purge performed by the purge unit before the liquid used for the ink-jet recording and including the ink and the treatment liquid, etc., is introduced into the flow channel, and then is recovered by being absorbed in the waste liquid absorber 22.

Next, still another example of the liquid recovery method of the present teaching will be explained with reference to FIG. 3B. The example shown in FIG. 3B is an aspect wherein the first liquid is recovered by discharging the first liquid from the ink-jet head 4 directly to the platen absorber 60. In FIG.

3B, same parts or portions as those in FIG. 2 are assigned with same reference numerals as those in FIG. 2.

When the liquid is recovered in this example, the ink-jet head 4 is stopped, without scanning in the scanning direction, and the ink(s) discharged from the nozzles 16 are discharged immediately downwardly. FIG. 3B shows an example wherein the liquid is recovered from the nozzle 16m for the magenta ink.

In FIG. 3B, the first liquid (magenta ink) is recovered by discharging the magenta ink from the nozzle 16m of the magenta ink toward the platen absorber 60 integrated into the platen 2, at a position at which the nozzle 16m is made to face or to be opposite to the platen absorber 60. Note that the recovery of the liquids from the nozzles 16bk, 16y and 16c can also be performed by moving the nozzles 16bk, 16y and 16c to positions at each of which one of the nozzles 16bk, 16y and 16c faces the platen absorber 60, in a similar manner as for the recovery of the magenta ink from the nozzle 16m. Further, in a case that the ink-jet head 4 has the nozzle for the treatment liquid, liquid recovery of the treatment liquid from the nozzle for the treatment liquid can also be performed by moving the nozzle for the treatment liquid to a position facing or to be opposite to the platen absorber 60, in a similar manner as for the recovery of the ink(s). In view of preventing any liquid leakage (dripping) from the absorber, the maximum amount of the second liquid which contains the specific solvent and which is contained in the platen absorber 60 is preferably not more than 0.91 μg/mm$^3$ and is more preferably not more than 0.7 μg/mm$^3$. Further, in view of suppressing the accumulation of the first liquid in the absorber, the minimum amount of the second liquid contained in the platen absorber 60 is preferably not less than 0.01 μg/mm$^3$ and is more preferably not less than 0.05 μg/mm$^3$.

Since the specific solvent is contained in the second liquid contained in the platen absorber 60, it is possible to suppress the accumulation of the first liquid containing the 2-pyrrolidone.

As explained above, according to the present teaching, it is possible to suppress the accumulation of the first liquid containing the 2-pyrrolidone in the liquid discharge recording apparatus, by causing the absorber, containing the second liquid containing the solvent of which freezing point is less than 20 degrees Celsius and of which specific gravity is less than 1.12 g/cm$^3$, to absorb the first liquid exited from the liquid discharge head.

EXAMPLES

Next, examples of the present teaching will be explained together with comparative examples. Note that the present teaching is not limited and is not restricted to the examples and the comparative examples which will be described below.

[Preparation of Ink]

Components, except for a self-dispersible pigment, which were included in Ink Composition (TABLE 2 as indicated below) were mixed uniformly or homogeneously; and thus an ink solvent was obtained. Subsequently, the ink solvent was added to the self-dispersible pigment dispersed in water, followed by being mixed uniformly. After that, the obtained mixture was filtrated through a cellulose acetate membrane filter (pore size 3.00 μm) produced by Toyo Roshi Kaisha, Ltd., and thus inks 1 and 2 for ink-jet recording were obtained.

TABLE 2

| | | INKS | |
|---|---|---|---|
| | | Ink 1 | Ink 2 |
| Ink Composition (unit: % by weight) | CAB-O-JET (trade name) 300 (*1) | 40 | 40 |
| | 2-pyrrolidone | 4 | 8 |
| | Glycerol | 20 | 20 |
| | Water | balance | balance |

(*1): Self-dispersible black pigment (produced by Cabot Corporation, pigment solid content: 15% by weight.

[Preparation of Second Liquid]

Second liquids 1-8 having the compositions shown in TABLE 3 as below were prepared.

TABLE 3

| | | SECOND LIQUIDS | | | | | | | |
|---|---|---|---|---|---|---|---|---|---|
| | | 1 | 2 | 3 | 4 | 5 | 6 | 7 | 8 |
| Composition of second liquid (unit: % by weight) | DEG | 100 | 50 | — | — | — | — | — | — |
| | BTG | — | — | 100 | 50 | — | — | — | — |
| | N-metyl-2P | — | — | — | — | 100 | 50 | — | — |
| | Glycerol | — | — | — | — | — | — | 100 | — |
| | Urea | — | — | — | — | — | — | — | 100 |
| | Water | — | 50 | — | 50 | — | 50 | — | — |

Examples 1-6 and Comparative Examples 1 and 2

100 μL of each of the second liquids 1-8 was permeated into a melamine foam (surface area: 1 cm$^2$, thickness: 5 mm), and then one of the inks 1 and 2 was used in combination with the second liquid as indicated in TABLE 4 as follows, so as to perform the evaluation of accumulation in accordance with the following method.

[Method of Evaluating Accumulation]

An ink-jet recording apparatus "MFC-J6910CDW", manufactured by Brother Kogyo Kabushiki Kaisha and having the melamine foam as described above arranged therein as a platen absorber, was prepared. The ink 1 or 2 used in each of Examples 1-7 and Comparative Examples 1 and 2 was poured into an empty ink tank and the ink tank was installed in a tank holder of the ink-jet recording apparatus MCF-J6910CDW so as to discharge the ink 1 or 2 from the ink-jet head of the ink-jet recording apparatus MFC-J6910CDW. After that, the ink-jet recording apparatus was connected to a host computer, a "borderless printing" was selected by a printer driver, and a sample image ISO/JIS-SCID (N3 fruit) was printed continuously on 500 sheets of Glossy Photo Paper "BP71", L size, manufactured by Brother Kogyo Kabushiki Kaisha. Then, the evaluation of accumulation was performed in accordance with the following evaluation criterion.

[Evaluation Criterion for Accumulation]

AA: No accumulation of the ink was observed on the melamine foam (platen absorber), and no contamination on the back surface of the glossy photo paper was observed in 500 sheets of the glossy photo paper.

A: No accumulation of the ink was observed on the melamine foam (platen absorber), but contamination on the back surface of the glossy photo paper was observed in not more than 2 sheets among 500 sheets of the glossy photo paper.

B: Accumulation of the ink was observed on the melamine foam (platen absorber), and contamination on the back surface of the glossy photo paper was observed in 3 to 49 sheets among 500 sheets of the glossy photo paper.

C: Accumulation of the ink was observed on the melamine foam (platen absorber), and contamination on the back surface of the glossy photo paper was observed in not less than 50 sheets among 500 sheets of the glossy photo paper.

The compositions of the inks and second liquids used in Examples 1-6 and Comparative Examples 1 and 2 and the results of measurements are shown in TABLE 4 as follows.

TABLE 4

|  | EXAMPLES | | | | | | COMPARATIVE EXAMPLES | |
|---|---|---|---|---|---|---|---|---|
|  | EX. 1 | EX. 2 | EX. 3 | EX. 4 | EX. 5 | EX. 6 | COM. EX. 1 | COM. EX. 2 |
| Ink | Ink 1 | Ink 1 | Ink 1 | Ink 1 | Ink 2 | Ink 2 | Ink 1 | Ink 2 |
| Second liquid | 1 | 2 | 3 | 4 | 5 | 6 | 7 | 8 |
| solvent | DEG | DEG | BTG | BTG | N-methyl-2P | N-methyl-2P | Glycerol | Urea |
| Freezing point (degrees Celsius) | −68 | −68 | −48 | −48 | −23 | −23 | 20 | 133 |
| Specific gravity (g/cm$^3$) | 1.197 | 1.197 | 0.9866 | 0.9866 | 1.027 | 1.027 | 1.26 | 1.335 |
| (Solvent)/(2-pyrrolidone) | 25 | 12.5 | 25 | 12.5 | 12.5 | 6.25 | 25 | 12.5 |
| Evaluation of accumulation | AA | AA | AA | AA | A | A | B | C |

As shown in TABLE 4, Examples 1-6 wherein the freezing point of the second liquid was less than 20 degrees Celsius and the specific gravity of the second liquid was less than 1.12 g/cm$^3$ had satisfactory results in the evaluation of accumulation. Since Examples 1-6 each had the satisfactory result in the evaluation of accumulation, Examples 1-6 are capable of suppressing the accumulation of the ink on the surface of the flushing absorber which is arranged in an area facing the ink-jet head, and also are capable of suppressing any contamination of the surface of the ink-jet head and the recording paper as well. Examples 1-4 in each of which the second liquid contained DEG or BTG and the freezing point of the second liquid was not more than −40 degrees Celsius particularly had excellent results in the evaluation of accumulation. Further, in each of Examples 1-6, the blending ratio of the solvent (specific solvent) contained in the second liquid was in a range of 6 times to 25 times the blending ratio of the 2-pyrrolidone contained in the first liquid.

On the other hand, Comparative Examples 1 and 2 which contained glycerol and urea in the second liquids, respectively, and in each of which the freezing point of the second liquid was not less than 20 degrees Celsius and the specific gravity of the second liquid was not less than 1.12 g/cm$^3$ had unsatisfactory results in the evaluation of accumulation. Since Comparative Examples 1 and 2 each had the unsatisfactory result in the evaluation of accumulation, it is feared that in Comparative Examples 1 and 2, the ink might accumulate on the surface of the flushing absorber and might contaminate the surface of the ink-jet head and the surface of the recording paper.

As described above, the liquid discharge recording apparatus of the present teaching is capable of suppressing the accumulation of the first liquid containing 2-pyrrolidone. The usage of the liquid discharge recording apparatus of the present teaching is not particularly limited, and is widely applicable to a variety of kinds of ink-jet recording.

What is claimed is:

1. A liquid discharge recording apparatus comprising:
   a first liquid containing 2-pyrrolidone;
   a liquid discharge head configured to discharge the first liquid;
   a second liquid containing a solvent of which freezing point is less than 20 degrees Celsius and of which specific gravity is less than 1.12; and
   an absorber which contains the second liquid and which is configured to absorb the first liquid exited from the liquid discharge head, wherein the absorber is selected from the group consisting of a flushing absorber, a waste liquid absorber, a platen absorber, and a combination thereof.

2. The liquid discharge recording apparatus according to claim 1, wherein the freezing point of the solvent is less than 10 degrees Celsius.

3. The liquid discharge recording apparatus according to claim 1, wherein the freezing point of the solvent is less than 0 degrees Celsius.

4. The liquid discharge recording apparatus according to claim 1, wherein the specific gravity of the solvent is smaller than a specific gravity of the first liquid.

5. The liquid discharge recording apparatus according to claim 1, wherein the solvent is at least one selected from the group consisting of polyhydric alcohol, glycol ether, nitrogen-containing compound and fatty acid.

6. The liquid discharge recording apparatus according to claim 1, wherein the solvent includes at least one selected from the group consisting of: diethylene glycol, triethylene glycol n-butyl ether, N-methyl-2-pyrrolidone, 1,5-pentanediol, 1,3-dimethyl-2-imidazolidinone, oleic acid, triethylene glycol, tetraethylene glycol n-butyl ether, propylene glycol n-butyl ether, dipropylene glycol n-butyl ether, tripropylene glycol n-butyl ether, dipropylene glycol n-propyl ether, erucic acid, and linoleic acid.

7. The liquid discharge recording apparatus according to claim 6, wherein the solvent includes at least one of the diethylene glycol and the triethylene glycol n-butyl ether.

8. The liquid discharge recording apparatus according to claim 1, wherein 20% by weight to 100% by weight of the solvent is contained in the second liquid.

9. The liquid discharge recording apparatus according to claim 1, wherein the second liquid is composed only of the solvent.

10. The liquid discharge recording apparatus according to claim 1, wherein the second liquid is an aqueous solution of the solvent.

11. The liquid discharge recording apparatus according to claim 1, wherein a blending ratio of the solvent in the second liquid is not less than 6 times a blending ratio of the 2-pyrrolidone in the first liquid.

12. The liquid discharge recording apparatus according to claim 11, wherein a blending ratio of the solvent in the second liquid is in a range of 6 times to 25 times a blending ratio of the 2-pyrrolidone in the first liquid.

13. The liquid discharge recording apparatus according to claim 1, wherein not less than 20% by weight of the solvent is contained in the second liquid; and
   a blending ratio of the solvent in the second liquid is not less than 5 times a blending ratio of the 2-pyrrolidone in the first liquid.

14. The liquid discharge recording apparatus according to claim 1,
   wherein the flushing absorber is arranged in a non-recording area of the liquid discharge recording apparatus, and is configured to receive the first liquid which the liquid discharge head discharges therefrom at a position at which the liquid discharge head faces the flushing absorber; and
   the platen absorber is arranged in a recording area of the liquid discharge recording apparatus, and is configured to receive the first liquid which the liquid discharge head discharges therefrom at a position at which the liquid discharge head faces the platen absorber.

15. The liquid discharge recording apparatus according to claim 1, wherein an amount of the second liquid contained per 1 $mm^3$ of the absorber is not more than 0.91 $\mu g/mm^3$.

16. The liquid discharge recording apparatus according to claim 1, wherein the absorber is a melamine foam.

17. The liquid discharge recording apparatus according to claim 1, wherein the first liquid is a water-based ink.

18. The liquid discharge recording apparatus according to claim 17, wherein the water-based ink contains a pigment.

19. A liquid-recovery method for recovering a liquid in a liquid discharge recording apparatus, the method comprising:
   causing a first liquid containing 2-pyrrolidone to exit from a liquid discharge head of the liquid discharge recording apparatus; and
   recovering the first liquid by absorbing the first liquid exited from the liquid discharge head with an absorber which is provided in the liquid discharge recording apparatus and which contains a second liquid, wherein the second liquid contains a solvent of which freezing point is less than 20 degrees Celsius and of which specific gravity is less than 1.12, and wherein the absorber is selected from the group consisting of a flushing absorber, a waste liquid absorber, a platen absorber, and a combination thereof.

20. The liquid-recovery method according to claim 19, wherein the first liquid is discharged from the liquid discharge head directly to the absorber.

* * * * *